United States Patent
Lowery

[15] 3,693,334
[45] Sept. 26, 1972

[54] LAWN MOWER AND EDGER MECHANISM

[72] Inventor: James R. Lowery, 2235 East Larkspan Drive, Phoenix, Ariz. 85022

[22] Filed: May 24, 1971

[21] Appl. No.: 146,177

[52] U.S. Cl. .................56/16.9, 56/17.1, 56/256
[51] Int. Cl. ..............................................A01g 3/06
[58] Field of Search............56/16.9, 17.1, 13.6, 13.7, 56/256

[56] References Cited

UNITED STATES PATENTS

| | | | |
|---|---|---|---|
| 3,183,652 | 5/1965 | Pratt | 56/13.7 |
| 2,909,021 | 10/1959 | McLane | 56/16.9 |
| 3,490,213 | 1/1970 | Pinto | 56/16.9 |
| 2,538,230 | 1/1951 | Boggs | 56/17.1 X |
| 2,771,730 | 11/1956 | True | 56/13.7 X |

Primary Examiner—Louis G. Mancene
Assistant Examiner—J. N. Eskovitz
Attorney—Herbert E. Haynes, Jr.

[57] ABSTRACT

A rotary lawn mower in combination with an edge trimmer is disclosed in which a single power source is employed to drive both mechanisms. The edge trimmer is positioned on the upper surface of the mower housing and is adapted to pivot into a retracted position when not in use so that the mower is able to function in a normal manner.

4 Claims, 7 Drawing Figures

INVENTOR
JAMES R. LOWERY
BY
Herbert C. Haynes Jr.
AGENT

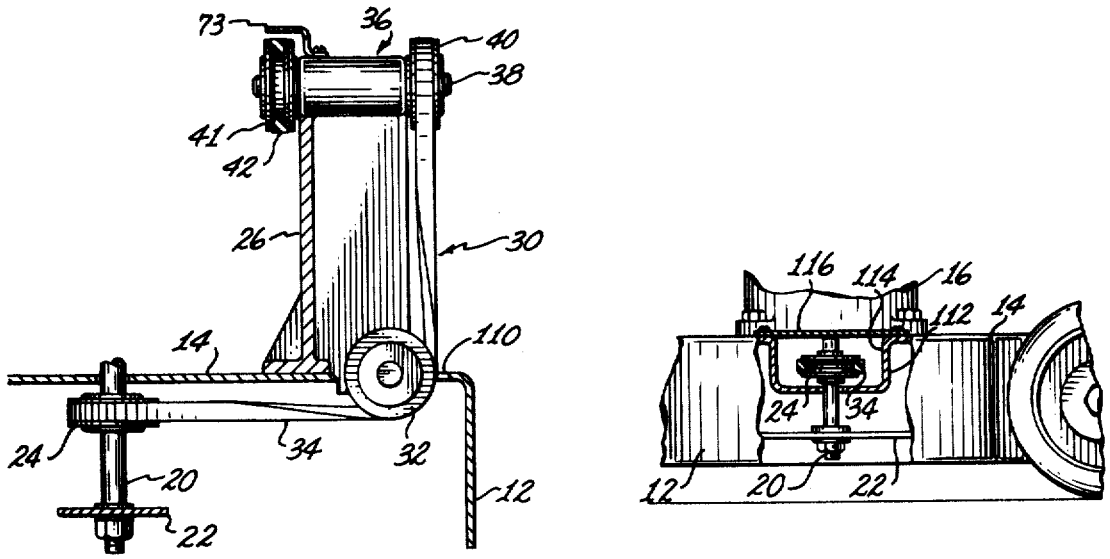
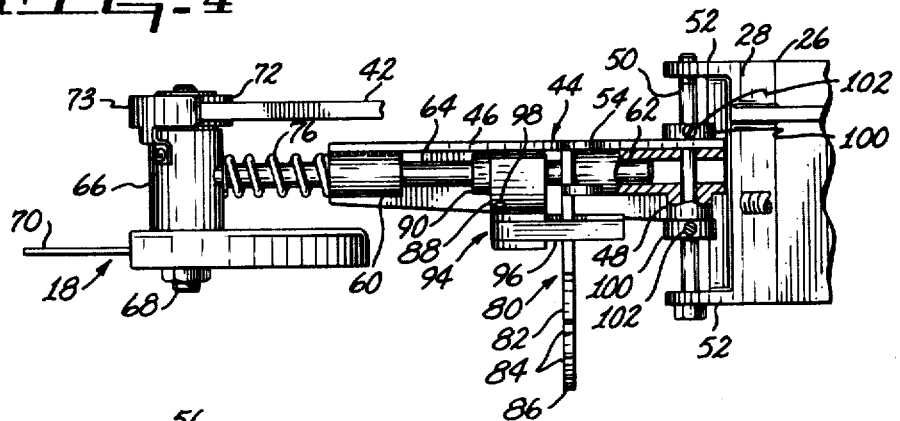
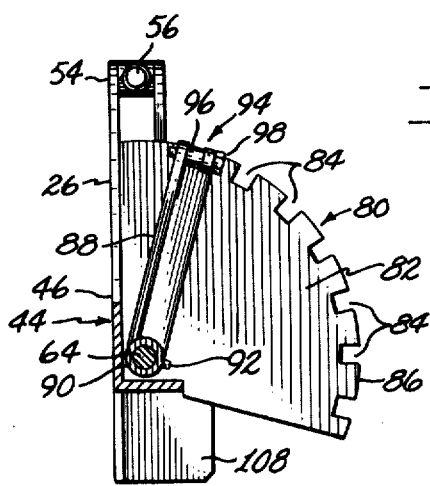

3,693,334

LAWN MOWER AND EDGER MECHANISM

BACKGROUND OF THE INVENTION

1. Field of the Invention

The present invention relates to lawn mowing machinery and more particularly to a rotary lawn mower and edger combination.

2. Description of the Prior Art

Motorized lawn care has traditionally involved the use of two separate machines, a lawn mower and an edger, thus requiring the purchase and maintenance of two power driven devices.

Several attempts have been made to combine the two mechanisms into a single machine with the obvious desirable features of less cost and maintenance. These desirable features result from the elimination of duplicate parts such as a power source, carriage, wheels and the like.

The prior art attempts at combining a lawn mower and edger into a single machine have resulted in cumbersome and complex devices which have received limited, if any, commercial acceptance. Some of these prior art machines have employed an edge trimming mechanism rigidly affixed to a mower housing, others have employed an extensible device. However both of these mounting methods have hampered the normal operation of the mower by having at least a portion of the edger mechanism permanently protruding from either the front or the side of the mower housing. If any portion of the edger mechanism is allowed to protrude from the mower housing, the mower cannot be employed to cut in corners or adjacent to structures such as buildings, fences, and the like.

In view of the foregoing, a need exists for a new and useful combined lawn mower and edger in which the edger mechanism will not hamper operation of the mower, and which is inexpensive, easy to operate and requires minimum maintenance.

SUMMARY OF THE INVENTION

In accordance with the invention, a new and useful combined lawn mower and edger is disclosed in which the edger is extensibly positioned on the upper surface of the mower housing so that when the edger is retracted it will be disposed substantially vertically to eliminate protrusions which would hamper normal mower operation.

The edger is a belt operated device driven by a power take-off pulley provided on the mower engine output shaft. A control handle is provided for moving the edger between the extended and the retracted positions. The edger is adapted for controllable height adjustment and for edger blade operation in various planes ranging from a vertical plane to a substantially horizontal plane.

The edger is positioned so that the trimmer blade drive belt is slack when the edger is retracted and taut when it is extended to provide automatic drive engagement and disengagement.

Accordingly, it is an object of the present invention to provide a new and useful combined lawn mower and edger mechanism.

Another object of the present invention is to provide a new and useful combined lawn mower and edger which is easy to operate and requires minimum maintenance.

Another object of the present invention is to provide a new and useful combined lawn mower and edger in which the edger is extensibly positioned on the upper surface of the mower housing and is adapted to retract into a substantially vertical position when not in use to eliminate protrusions which hamper normal mowing operations.

The foregoing and other objects of this invention, the various features thereof, as well as the invention itself, may be more fully understood from the following description when read in conjunction with the accompanying drawings.

BRIEF DESCRIPTION OF THE DRAWINGS

FIG. 4 is a sectional view taken on the line 4—4 of FIG. 2;

FIG. 5 is a fragmentary top view taken on the line 5—5 of FIG. 2;

FIG. 6 is a sectional view taken on the line 6—6 of FIG. 2; and

FIG. 7 is a fragmentary view showing a modification of a portion of the structure of the present invention.

DESCRIPTION OF THE PREFERRED EMBODIMENT

Figure 1:
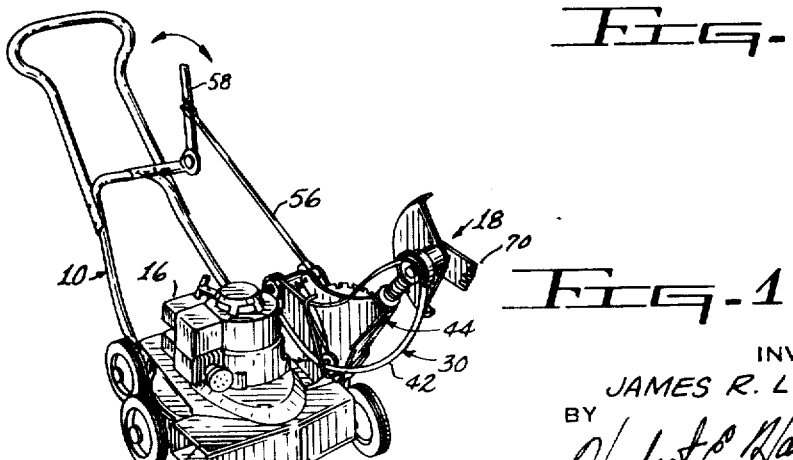
FIG. 1 is a perspective view of the combined lawn mower and edger mechanism of the present invention.

Referring more particularly to the drawings, FIG. 1 illustrates the combined lawn mower and edger mechanism of the present invention indicated generally by the reference numeral 10. The lawn mower edger mechanism 10 comprises a wheeled carriage 12 having a substantially horizontal deck 14 on which is supported a suitable power means 16. The power means 16 is shown as a conventional gas operated engine, however, it should be noted that electric motors, such as those which are sometimes employed in lawn mowing machinery, will work equally as well in the mechanism of the present invention. An extensible edger means 18 is positioned on the horizontal deck 14 of the wheeled carriage 12.

Figure 3:
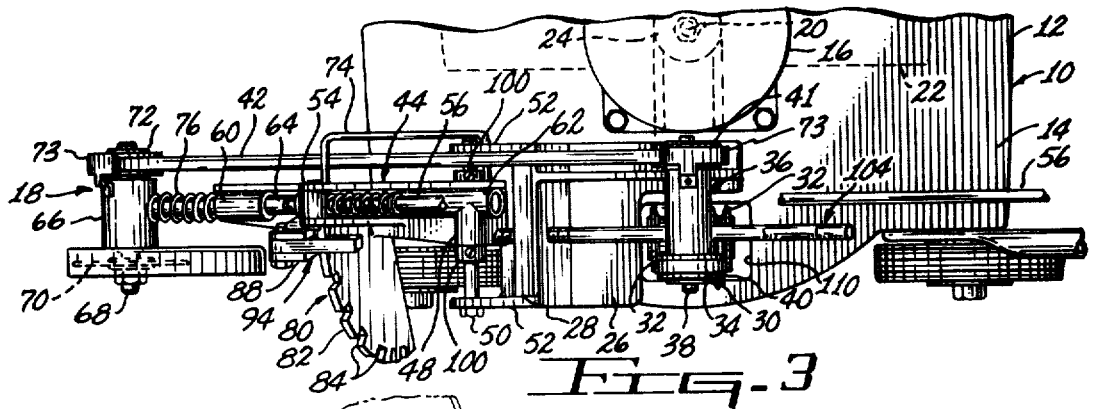
FIG. 3 is a fragmentary plan view illustrating the mechanism of the present invention.
Figure 2:
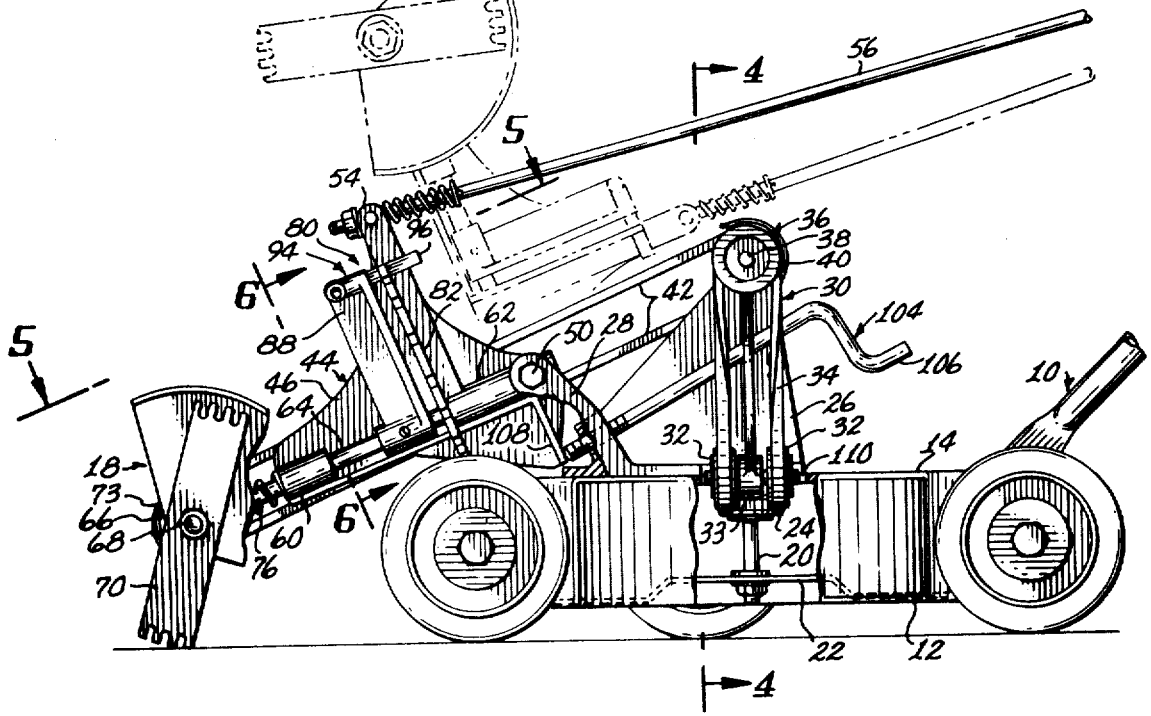
FIG. 2 is a fragmentary side view of the mechanism of the present invention partially broken away to illustrate the various features thereof.

As seen best in FIGS. 2, 3, and 4, the power means 16 is provided with a vertically disposed downwardly depending output shaft 20 which extends from the power means 16 through the horizontal deck 14 of the wheeled carriage 12. A mower blade 22 is secured to the lower end of the output shaft 20 and is disposed to rotate in a substantially horizontal plane. A power take-off pulley 24 is provided on the shaft 20 and is located between the horizontal surface 14 of the wheeled carriage 12 and the mower blade 22.

An upstanding member 26 is provided on the upper surface of the deck 14. It should be noted that the upstanding member 26 may be removably attached to the wheeled carriage 12, or may be formed integral therewith. The upstanding member 26 is provided with an angularly upwardly disposed yolk 28 to which the extensible edger means 18 is pivotably mounted as will hereinafter be described in detail.

A drive means 30 is provided which includes a pair of idler pulleys 32 rotatably journaled in a boss 33 suitably attached to the upstanding member 26. The idler pulleys 32 are laterally disposed and in alignment with the power take-off pulley 24 so that a belt 34, driven by power take-off pulley 24, will change its operational path when operated over the idler pulleys 32. As best seen in FIG. 4, the belt 34 extends substantially vertically from the idler pulleys 32 and drivingly engages a power coupling means 36 provided on the upper portion of the upstanding member 26.

The power coupling means 36 comprises a shaft 38 rotatably journaled on the upstanding member 26. A drive pulley 40 is provided on one end of the shaft 38 and is positioned to be driven by the belt 34. A drive pulley 41 is attached to the other end of the shaft 38 and is positioned to drive a second belt 42 which powers the edger means 18 as will be described.

The extensible operation of the edger means 18 is accomplished by controlling the movements of an arm 44 which is pivotably connected to the yolk 28. The arm 44 is provided with a vertically disposed plate 46 which extends longitudinally with respect to the wheeled carriage 12. A spindle 48 is provided on the rear portion of the plate 46 and is adapted to pivot the arm 44 about an axle 50 carried in a pair of spaced apart lugs 52 of yolk 28. The arm 44 is provided with an upwardly disposed clevis 54 by which movements of the arm 44 are controlled. A control rod 56, having one end thereof pivotably connected to the clevis 54 is provided on its other end with a lever 58 by which the edger means 18 is rotated from a downwardly forwardly extending working position as shown in solid lines in FIG. 2 to a substantially vertical storage position as indicated in broken lines in the same figure.

The arm 44 is provided with a pair of spaced apart bosses 60 and 62. An elongated shaft 64 is carried in the bosses 60 and 62 and is axially rotatable and longitudinally reciprocal therein. A sleeve 66 is secured to the outer most extending end of the elongated shaft 64, and is positioned transverse with respect to the longitudinal axis of the shaft. A stub shaft 68 is journaled for rotation within the sleeve 66. A suitable edger blade 70 is mounted on one end of the stub shaft 68 and a driven pulley 72 is provided on the other end thereof which is positioned to align with and be driven by the second belt 42.

The second belt 42 will drive the edger blade 70 when the edger means 18 is in the working position as shown in FIG. 2. The belt 42 will be taut in the working position and as seen in FIG. 1 when the edger means 18 is pivoted to the storage position, the belt 42 becomes slack.

The pulley 41 of the power coupling means 36 and the pulley 72 on stub shaft 68 are both provided with belt guards 73. The belt guards 73 are adapted to hold the belt 42 in engagement with the pulleys when the belt is slack. A U-shaped holding bracket 74 is provided on the arm 44 through which the belt 42 operates. The holding bracket 74 is designed to limit any lateral movements of the belt which may occur when the edger means 18 is in the storage position. A biasing spring 76 is provided between the sleeve 66 and the boss 60 to urge the elongated shaft 64 to a longitudinally extended position relative to the arm 44. With the elongated shaft 64 biased in this manner, the pulley 72 which is driven by the belt 42 will also be urged in a longitudinally extended position thus holding the belt 42 taut. The biasing spring 76 will also act as a shock absorber by allowing the elongated shaft 64 to longitudinally reciprocate within the bosses 60 and 62 when obstructions are encountered by the edger blade 70.

The elongated shaft 64 is axially rotatable within the bosses 60 and 62 to provide for selective positioning of the operating plane of the edger blade 70. The edger blade 70 is shown in FIG. 2 as being positioned in a substantially vertical plane. By axially rotating the shaft 64, the operating plane of the edger blade 70 may be changed in increments from the illustrated vertical plane to a substantially horizontal plane.

As seen best in FIGS. 2, 5 and 6, a plane selecting means 80 is provided. The plane selecting means 80 comprises a quadrant 82 appropriately secured to the plate 46 of the arm 44. The quadrant 82 is disposed transverse with respect to the elongated shaft 64. The quadrant 82 is provided with a plurality of incrementally spaced notches 84 formed in the arcuate peripheral edge 86 thereof. A lever 88 having a collar 90 formed on one end thereof is slidably positionable on the elongated shaft 64 and may be secured thereto by an appropriate set screw 92. The lever 88 extends radially from the elongated shaft 64 and is positioned adjacent to the quadrant 82. A latch means 94 is provided on the other end of the lever 88 so that when the operating plane of the edger blade 70 has been selected, the latch means 94 may be moved into engagement with one of the notches 84 and thus hold the operating plane of the blade. The latch means 94 comprises an elongated pin 96 which pivots about a suitable pivot pin 98 carried in the radially extending lever 88.

As seen best in FIGS. 3 and 5, the edger means 18 may be laterally positioned with respect to the longitudinal axis of the wheeled carriage 12. To accomplish this the spindle 48 is slidably movable along the longitudinal axis of axle 50, and may be held in a desired position on the axle 50 by a pair of holding collars 100. The holding collars 100 are carried on the axle 50 with one of the collars 100 being positioned on either side of the spindle 48. Each of the holding collars are provided with a set screw 102 by which the collars are secured to the axle 50 when the lateral position of the edger means 18 has been selected.

A stop means 104 is provided on the upstanding member 26 and is engageable with the arm 44 to provide adjustment in the vertical position of the edger blade 70 when the edger means 18 is in the working position. The stop means 104 comprises a crank handle 106 threadably mounted to the upstanding member 26 and is positioned thereon to engage a stop plate 108 which is provided on the arm 44.

As seen in FIG. 4, the belt 34 extends laterally from the power take-off pulley 24 and operates over the idler pulleys 32 and extends upwardly through a hole 110 provided in the horizontal deck 14 of the wheeled carriage 12. This method may be employed when the upstanding member 26 is removably attached to the wheeled carriage 18. When the upstanding member 26 is formed integral with the wheeled carriage 12, a downwardly disposed trough 112, as shown in FIG. 7, may be cast or otherwise formed in the wheeled carriage 12. The trough 112 extends below the lowest point of the power take-off pulley 24, and is laterally disposed so that the power take-off pulley 24, the belt 34, and the idler pulleys 32 are shielded from grass and debris resulting from the mowing operations. The trough 112 is provided with an upwardly disposed opening 114 which may be covered by a removable plate 116.

While the principles of the invention have now been made clear in an illustrated embodiment, there will be immediately obvious to those skilled in the art many modifications of structure, arrangements, proportions, the elements, materials, and components used in the practice of the invention, and otherwise, which are particularly adapted for specific environments and operating requirements without departing from those principles. For example, the drive means of the present invention may be driven by power take-off pulleys attached to the opposite end of an engine or motor shaft from that which is shown and described. The power take-off pulley 24 could be mounted on the fly-wheel or starter end of the shaft of the power means 16 rather than on the end to which the mower blade is attached. The appended claims are therefore intended to cover and embrace any such modifications within the limits only of the true spirit and scope of the invention.

What I claim is:

1. A lawn mower and edger mechanism comprising in combination:
    a. a wheeled carriage having a substantially horizontal deck with an aperture formed therethrough;
    b. power means supported on the upper surface of the deck of said wheeled carriage, said power means having an output shaft extending downwardly through the deck;
    c. a mower blade secured to the output shaft of said power means;
    d. a power take-off pulley secured to the output shaft of said power means at a point between the horizontal surface of the deck and said mower blade;
    e. an upstanding member on the upper surface of the deck of said wheeled carriage;
    f. edger means pivotably mounted on said upstanding member, said edger means movable between a downwardly forwardly extending working position and a substantially vertical storage position, said edger means comprising:
        1. an arm pivotably mounted on said upstanding member and movable in a plane substantially parallel to the longitudinal axis of said wheeled carriage;
        2. an elongated shaft movably journalled on said arm and extending longitudinally of said arm, said shaft being longitudinally reciprocal and axially rotatable relative to said arm;
        3. a sleeve transversely carried on the outermost extending end of said shaft;
        4. a stub shaft rotatably journalled in said sleeve;
        5. an edger blade affixed to one end of said stub shaft;
        6. a pulley affixed to the other end of said stub shaft;
        7. plane selecting means connected to said elongated shaft and to said arm for selecting the operating plane of said edger blade;
        8. stop means on said upstanding member and engagable with said arm for adjustably determining the vertical position of said edger blade when said edger means is in the working position;
        9. a control rod connected to said arm for moving said edger means between its working position and its storage position;
        10. biasing means between said arm and said sleeve for urging said elongated shaft to a longitudinally extended position relative to said arm; and
    g. driving means interconnected between said power take-off pulley and said pulley affixed to the other end of said stub shaft through the aperture formed in said wheeled carriage, said driving means operative when said edger is in the working position, and inoperative when said edger means is in the storage position.

2. A lawn mower and edger as claimed in claim 1 wherein said plane selecting means comprises:
    a. a quadrant attached to said arm and positioned in a plane transverse to the longitudinal dimension of said arm, said quadrant having a plurality of notches formed in spaced increments in the arcuate peripheral edge thereof;
    b. a radially extending lever attached to said elongated shaft for axially rotating said elongated shaft, said lever positioned adjacent to said quadrant; and
    c. latch means on said lever and engagable with the notches of said quadrant for holding said elongated shaft in the axially rotated position when said edger blade is in a desired operating plane.

3. A lawn mower and edger as claimed in claim 1 wherein said stop means comprises a crank handle threadably mounted in said upstanding member.

4. A lawn mower and edger as claimed in claim 1 wherein said edger means further comprises means on said arm and on said upstanding member for laterally positioning said edger blade with respect to the longitudinal axis of said wheeled carriage.

* * * * *

UNITED STATES PATENT AND TRADEMARK OFFICE
CERTIFICATE OF CORRECTION

| | | |
|---|---|---|
| PATENT NO. | : 3,693,334 | Page 1 of 3 |
| APPLICATION NO. | : 05/146177 | |
| DATED | : September 26, 1972 | |
| INVENTOR(S) | : Lowery | |

It is certified that error appears in the above-identified patent and that said Letters Patent is hereby corrected as shown below:

Delete Drawing Sheets 1 – 2 and Substitute therefor the Drawing Sheets consisting of FIGS 1-7 as shown on the attached pages.

Signed and Sealed this

Sixteenth Day of December, 2008

JON W. DUDAS
*Director of the United States Patent and Trademark Office*

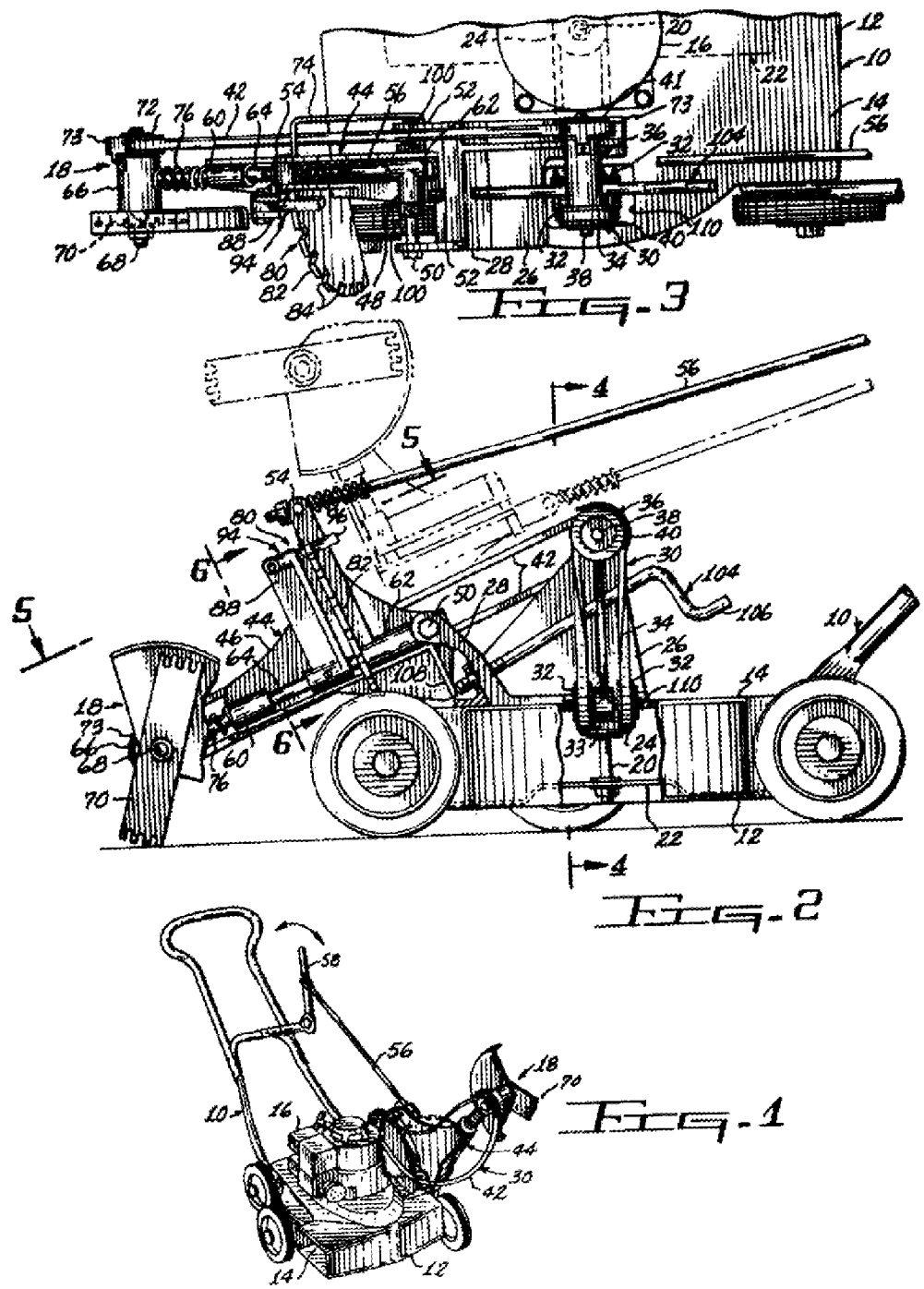

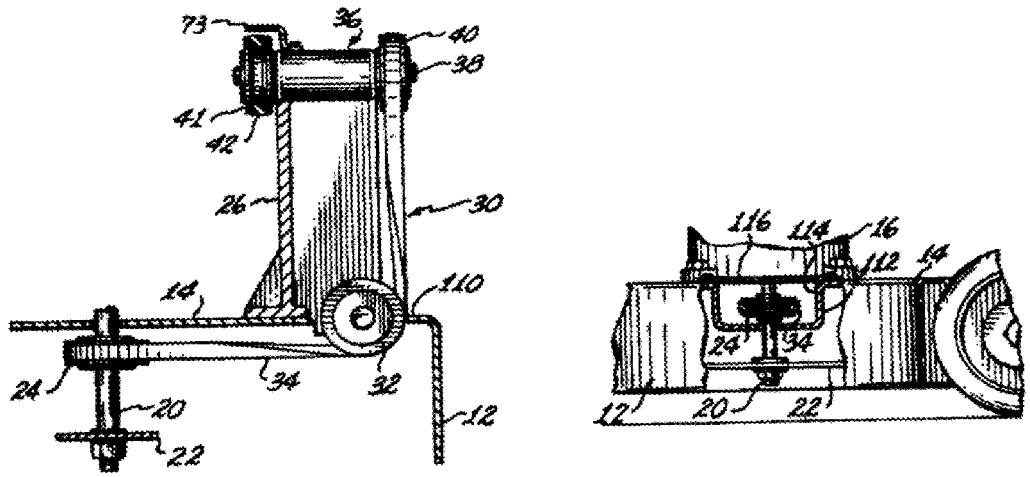
Fig-4
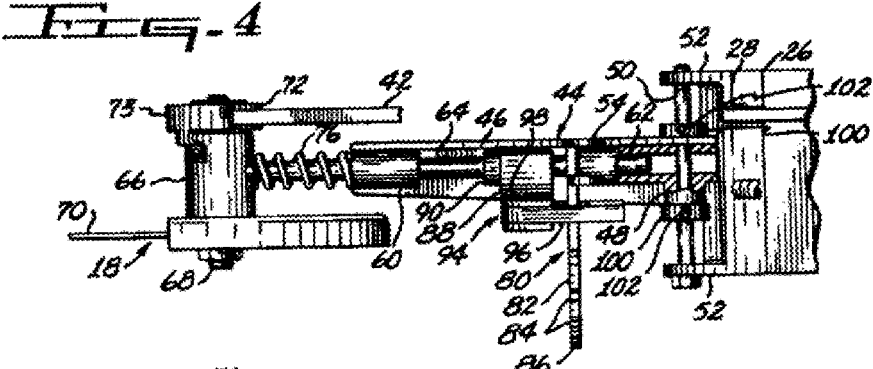
Fig-7
Fig-5
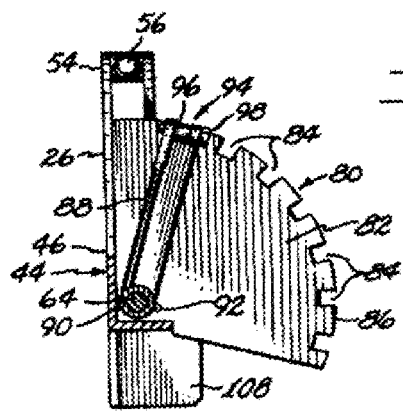
Fig-6